United States Patent
Niemi (10) Patent No.: US 10,200,257 B2
(45) Date of Patent: *Feb. 5, 2019

(54) INDIRECT DEVICE COMMUNICATION

(75) Inventor: Sami Niemi, Skanor (SE)

(73) Assignee: Nokia Technologies Oy, Espoo (FI)

( * ) Notice: Subject to any disclaimer, the term of this patent is extended or adjusted under 35 U.S.C. 154(b) by 310 days.

This patent is subject to a terminal disclaimer.

(21) Appl. No.: 13/808,542

(22) PCT Filed: Jun. 28, 2011

(86) PCT No.: PCT/SE2011/050855
§ 371 (c)(1),
(2), (4) Date: Feb. 1, 2013

(87) PCT Pub. No.: WO2012/005665
PCT Pub. Date: Jan. 12, 2012

(65) Prior Publication Data
US 2013/0143498 A1 Jun. 6, 2013

(30) Foreign Application Priority Data

Jul. 8, 2010 (EP) .................................. 10168922

(51) Int. Cl.
*H04W 12/06* (2009.01)
*H04B 7/24* (2006.01)
(Continued)

(52) U.S. Cl.
CPC .............. *H04L 41/28* (2013.01); *H04B 7/24* (2013.01); *H04L 63/08* (2013.01); *H04L 63/18* (2013.01); *H04W 12/06* (2013.01)

(58) Field of Classification Search
CPC ........... H04B 7/24; H04L 41/28; H04L 63/08; H04L 63/18; H04W 12/06
(Continued)

(56) References Cited

U.S. PATENT DOCUMENTS 4,873,711 A * 10/1989 Roberts et al. ............ 455/412.2
5,929,848 A 7/1999 Albukerk et al.
(Continued)

FOREIGN PATENT DOCUMENTS

CN 101076976 A 11/2007
CN 101128052 2/2008
(Continued)

OTHER PUBLICATIONS

PCT Search Report for International Application No. PCT/SE2011/050855—Date of Completion of Search: Oct. 26, 2011, 5 pages.
(Continued)

*Primary Examiner* — Yuwen Pan
*Assistant Examiner* — Fatuma G Sherif
(74) *Attorney, Agent, or Firm* — Locke Lord LLP (57) ABSTRACT

There is disclosed means for in a communications device enabling an indirect communications channel between the communications device and at least one further communications device. A data service selected from a set of data services is associated with an identity code. The identity code identifies the communications device. Data related to the identity code is transmitted to a server. The data is preferably transmitted through a radio-frequency based communications interface. The identity code is broadcasting during a predetermined period of time and intended to be received by the at least one further communications device. The broadcast is preferably transmitted through a short-range non-radio frequency based communications interface.

20 Claims, 5 Drawing Sheets

(51) Int. Cl.
*H04L 12/24* (2006.01)
*H04L 29/06* (2006.01)

(58) Field of Classification Search
USPC ........................................................ 455/41.2
See application file for complete search history.

(56) References Cited

U.S. PATENT DOCUMENTS

| | | | |
|---|---|---|---|
| 2002/0034959 A1* | 3/2002 | Jamieson et al. | ............. 455/517 |
| 2002/0131445 A1* | 9/2002 | Skubic | .............. H04L 29/12254 |
| | | | 370/465 |
| 2004/0123333 A1 | 6/2004 | Nakatsuyama | |
| 2005/0289117 A1 | 12/2005 | Hirashi et al. | |
| 2007/0112687 A1 | 5/2007 | Read | |
| 2007/0254709 A1* | 11/2007 | Higgins | ................. H04B 1/385 |
| | | | 455/557 |
| 2008/0045189 A1 | 2/2008 | Kim et al. | |
| 2008/0209056 A1 | 8/2008 | Choi | |
| 2009/0181653 A1* | 7/2009 | Alharayeri | .............. H04W 4/02 |
| | | | 455/414.1 |
| 2009/0239502 A1* | 9/2009 | Dempo et al. | ................. 455/411 |
| 2010/0009703 A1 | 1/2010 | Sornay | |
| 2010/0029326 A1 | 2/2010 | Bergstrom et al. | |
| 2010/0061294 A1* | 3/2010 | Proctor, Jr. | ........ G06Q 30/0623 |
| | | | 370/328 |
| 2010/0222072 A1 | 9/2010 | Dragt | |
| 2010/0222087 A1 | 9/2010 | Dragt | |
| 2010/0222088 A1 | 9/2010 | Dragt | |
| 2010/0222100 A1 | 9/2010 | Dragt | |
| 2010/0223138 A1 | 9/2010 | Dragt | |

FOREIGN PATENT DOCUMENTS

| | | |
|---|---|---|
| CN | 101681337 A | 3/2010 |
| EP | 1746518 | 1/2007 |
| EP | 1821459 | 8/2007 |
| EP | 1892603 | 2/2008 |
| EP | 2124420 | 11/2009 |
| GB | 2352587 | 1/2001 |
| GB | GB2352587 | 1/2001 |
| WO | WO0193047 | 12/2001 |
| WO | WO2008041942 | 4/2008 |
| WO | WO2008115142 | 9/2008 |
| WO | WO2008142455 | 11/2008 |
| WO | WO2009101549 | 8/2009 |

OTHER PUBLICATIONS

English Language Machine Translation of Chinese Patent Application Publication No. CN101128052A—5 pages.
PCT Search Report for International Application No. PCT/SE2011/050678—Date of Completion of Search: Oct. 25, 2011, 5 pages.
English Language Machine Translation of Chinese Patent Application Publication No. CN101076976A—17 pages.
English Language Machine Translation of Chinese Patent Application Publication No. CN101681337A—16 pages.
Extended European Search Report for European Patent Application No. 11803884.3, dated Feb. 28, 2017, 6 pages.
Examination Report for Indian Patent Application No. 952/CHENP/2013, dated Apr. 27, 2018, 6 pages.

* cited by examiner

INDIRECT DEVICE COMMUNICATION

TECHNICAL FIELD OF THE INVENTION

The present invention relates to the field of device communication, and more particularly to methods for enabling an indirect communications channel between communications devices. There is also provided devices and a computer program product thereof.

BACKGROUND OF THE INVENTION

Over the last few years communications devices, such as mobile phones, have evolved from being just communications devices to being handheld multimedia devices. In addition, more and more devices are being provided with communications interfaces. Thus, the number of devices being able to communicate information between each other is constantly increasing.

The number of services and applications being based on communications between such devices is also increases. A few examples include, but are not limited to, social medias based on digital networks, instant message sharing, sharing and displaying of information, and the like.

Thus, as the number of communications devices increases so too does the need to communicate data between the communications devices. It may therefore be desired that the communications devices should be arranged to instantly initiate communications with each other in a intuitive and instant way.

Short-range radio communication technologies based on the Bluetooth standard (Bluetooth is a registered trademark) or WiFi, allow devices to broadcast a short-range radio signal, thereby letting their presence to be known to other devices. Thereby two devices may be paired.

There has also been proposed a pairing process based on physically bumping the two devices to be paired with each other. Each device generates a timestamp associated with the bump and transmits the timestamp together with location information (such as GPS coordinates or cell information) to a server. The server may use this information as input to mathematical methods in order to determined which devices that bumped together.

SUMMARY OF THE INVENTION

As noted above there exists means according to the state of the art which enable two devices to communicate with each other. However, it may still be difficult to initiate the communications between the two devices. Short-range radio communication technologies based on the Bluetooth standard are for example complex and the duration for initialisation can be long. Technologies based on physically bumping devices with each other require a physical contact to be established between the devices (which may potentially damage the devices) and also require a server to perform mathematical calculations to determine which devices that bumped together. In addition, an eavesdropping device may potentially be erroneously paired with another device by bumping the eavesdropping device with another object as the two devices intended to be paired are bumped together. The eavesdropping device thereby generates a timestamp of the bump which is close in time to the timestamps generated by the two devices intended to be paired and is thereby able to transmit the timestamp together with location information which is similar, or even identical to, the location information transmitted by the two devices intended to be paired.

In view of the above it may therefore be desirable to find means which enable simple, intuitive and instant but still secure initialisation of communications between two devices, so that a data service can be established between the devices. According to a first aspect there is provided a method for in a communications device enabling an indirect communications channel between the communications device and at least one further communications device, comprising associating, in a processing unit, a data service selected from a set of data services with an identity code, the identity code identifying the communications device; transmitting, through a first communications interface, data related to the identity code to a server; and broadcasting, through a second communications interface different from the first communications interface, the identity code during a predetermined period of time, the identity code being intended to be received by the at least one further communications device.

Advantageously this provides for a simple, intuitive and instant but still secure initialisation of communications between two communications devices. By broadcasting an identity code instead of transmitting a message to a dedicated receiving communications device, the communications device issuing the broadcast is not bound to initialize communications with a specific dedicated receiving communications device.

According to a second aspect there is provided a method for in a communications device enabling an indirect communications channel between the communications device and at least one further communications device, comprising receiving a broadcast, through a second communications interface, comprising an identity code during a predetermined period of time, the identity code identifying the at least one further communications device; associating, in a processing unit, a data service selected from a set of data services with the identity code; and transmitting, through a first communications interface different from the second communications interface, data related to the identity code to a server.

The data service may be related to multimedia data. Thus, advantageously the disclosed subject matter may enable initialisation of multimedia communications.

The methods may further comprise receiving, from the at least one further communications device, data and thereto coupled authentication information; evaluating, in the processing unit and based on the authentication information, whether or not the first communications device shall access the data service; and in response to a positive evaluation thereof, processing the received data.

The data service may relate to a data service made available by the communications device. The methods may in this case further comprise receiving, from the server and through the first communications interface, a request pertaining to whether or not the at least one further communications device shall be granted access to the data service; evaluating, in the processing unit, whether or not the at least one further communications device communications device shall be granted access to the data service; and in response to a positive evaluation thereof, transmitting, through the first communications interface, a message to the server allowing the at least one further communications device to access the data service. Thus, advantageously this enables initialisation of a "push data" service.

The data service may relate to a data service requested by the communications device. The methods may in this case further comprise receiving, from the server and through the first communications interface, an acknowledgement confirming that the at least one further communications device has allowed the communications device to access the data service; and accessing the data service by transmitting, through the first communications interface, a data service request message relating to the data service to the server. Thus, advantageously this enables initialisation of a "pull data" service.

The methods may further comprise receiving, from the server and through the first communications interface, parameters relating to the identity code; and generating, in the processing unit, the identity code based on the received parameters. Thus, advantageously the server holds information relating to the identity code. By comparing the parameters to parameters of previously generated identity code the server may thereby guarantee that the identity code related to the parameters is unique.

The methods may further comprise extracting code parameters based on at least one from a group of user input, time, position, and picture data; and generating the identity code based on the code parameters. The picture data may be associated with a picture having been captured by the communications device. The picture data may be user definable. Thus, advantageously the user of the communications device is enabled to at least partly affect the structure of the identity code.

The second communications interface may be a non-radio frequency transmitter interface. The second communications interface may be a user interface of the communications device. Particularly the user interface may be one from the group of an audio interface, whereby the identity code is broadcast as an audio signal, and a tactile interface, whereby the identity code is broadcast as a tactile signal. In addition, the user interface may be arranged to display visual data and the visual data may define the identity code. Different types of identity codes may me suitable for different circumstances. For example, it may be advantageous not to use an audible identity code in a noisy environment. For example, it may be advantageous not to use a picture based code in an environment with strong sunlight. Advantageously the identity code may thereby be made suitable for such different circumstances.

The identity code itself may identify the data service associated therewith. Thus, advantageously this enables an embedded transmission of identity code and data service.

The second communications interface may be arranged to broadcast the identity code within a predetermined radius of the communications device. Thus, advantageously this allows a user to define the radius within which the identity code may be received by the at least one further communications device, thereby indirectly at least partly controlling which of the at least one further communications device that should receive the broadcast. This may also enable the communications device to issue the broadcast using only limited power resources.

According to a third aspect there is provided a communications device for enabling an indirect communications channel between the communications device and at least one further communications device, comprising means for associating, in a processing unit, a data service selected from a set of data services with an identity code, the identity code identifying the communications device; means for transmitting, through a first communications interface, data related to the identity code to a server; and means for broadcasting, through a second communications interface different from the first communications interface, the identity code during a predetermined period of time and intended to be received by the at least one further communications device.

According to a fourth aspect there is provided a communications device for enabling an indirect communications channel between the communications device and at least one further communications device, comprising means for receiving a broadcast, through a second communications interface, comprising an identity code during a predetermined period of time, the identity code identifying the at least one further communications device; means for associating, in a processing unit, a data service selected from a set of data services with the identity code; and means for transmitting, through a first communications interface different from the second communications interface, data related to the identity code to a server.

According to a fifth aspect there is provided a computer program product comprising software instructions that when downloaded to a computer is configured to perform any of the methods disclosed above.

The second, third, fourth and fifth aspects may generally have the same features and advantages as the first aspect. Other objectives, features and advantages of the present invention will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the present invention will now be described in more detail by way of non-limiting examples, reference being made to the enclosed drawings, in which.

DETAILED DESCRIPTION OF PREFERRED EMBODIMENTS

The present invention will now be described more fully hereinafter with reference to the accompanying drawings, in which certain embodiments are shown. Like numbers refer to like elements throughout. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

Figure 1:
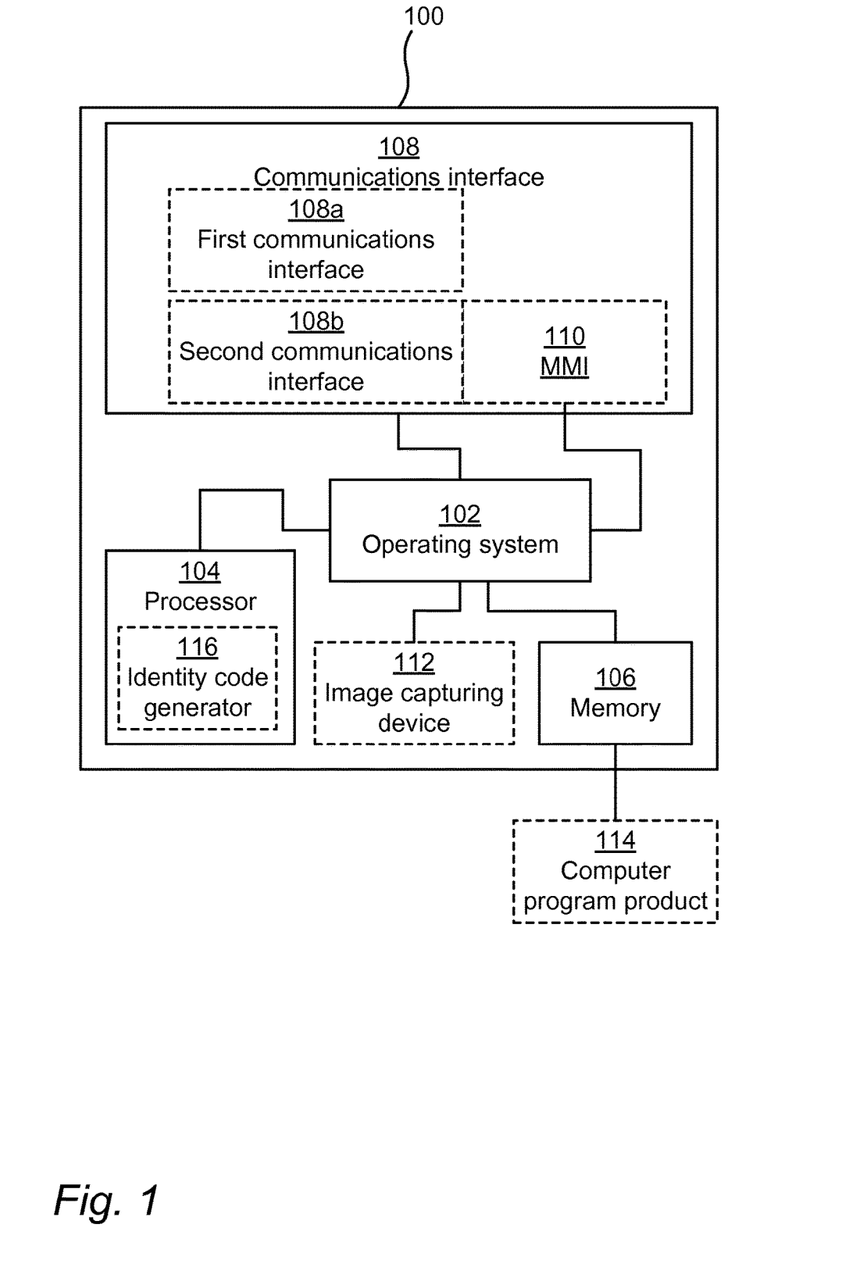
FIG. 1 is a schematic illustration of a communications device according to embodiments.

FIG. 1 is a schematic illustration of a communications device 100 according to an embodiment. The communications device 100 may be a computer. The communications device 100 may be a personal digital assistant (PDA). The communications device 100 may be a mobile phone. The communications device 100 may even be a digital projector. The communications device 100 generally comprises circuitry arranged to perform a number of operations and will now be described in terms of functional blocks. In general, the functional blocks may be implemented in various ways, such as by programming one or more field programmable gate arrays (FPGAs), applications specified integrated circuits (ASICs), or the like. The communications device 100 comprises a processor functional block 104, which may be embodied as a central processing unit and/or a dedicated image processing unit, such as a JPEG hardware accelerator. The processor may also refer to a graphics processing unit (GPU), capable of calculations, such as pixel/fragment shaders in OpenGL/OpenCL. The image processing unit may be implemented as a computer program product comprising one or more software components, or as a dedicated hardware unit for image processing. The software components may comprise software instructions that when downloaded to a computer are configured to perform the instructions associated with the processing unit. The communications device 100 further comprises a memory functional block 106, which may be embodied as a memory or a computer-readable storage medium, such as a random access memory (RAM), a read-only memory (ROM), a universal series bus (USB) product, such as a memory stick, or the like.

The communications device 100 further comprises a communications functional block 108, which may be embodied as a receiver and a transmitter and/or a transceiver, inter alia configured to receive input from, and deliver output to, a man-machine interface (MMI) 110 functional block, another communications device, computer, or the like.

Particularly, the communications functional block 108 may comprise a first communications interface 108a and a second communications interface 108b. The man-machine interface (MMI) 110 functional block may define a user interface. The user interface may be an integral part of the second communications interface 108b.

The communications device 100 may further comprise an identity code generator functional block 116 arranged to generate an identity code of the communications device 100. The identity code generator functional block 116 may be implemented in the processing unit.

The communications device 100 is run under supervision of an operating system 102. The communications device 100 may further comprise an image capturing device 112, which may be embodied as a digital camera or the like. Alternatively the communications device 100 may be operatively coupled to an external image capturing device (not shown) via the communications interface functional block 108. The communications device 100 may have access to sets of images from which one or more images may be selected. Such images may originate from still images or from a video sequence, such as a video file, or from a video surveillance camera. The external image capturing device may be coupled to the communications device 100 through an external network interface which may be wireless, such as a 3G modem, or a WLAN.

The memory functional block 106 may hold a computer program product 114 comprising software instructions that, when downloaded to a computer, such as the device 100, and run on the processor 104 are configured to perform the subject matter disclosed herein. Alternatively, the software instructions may be separately distributable to be distributed in a network, see FIG. 2.

Figure 2:
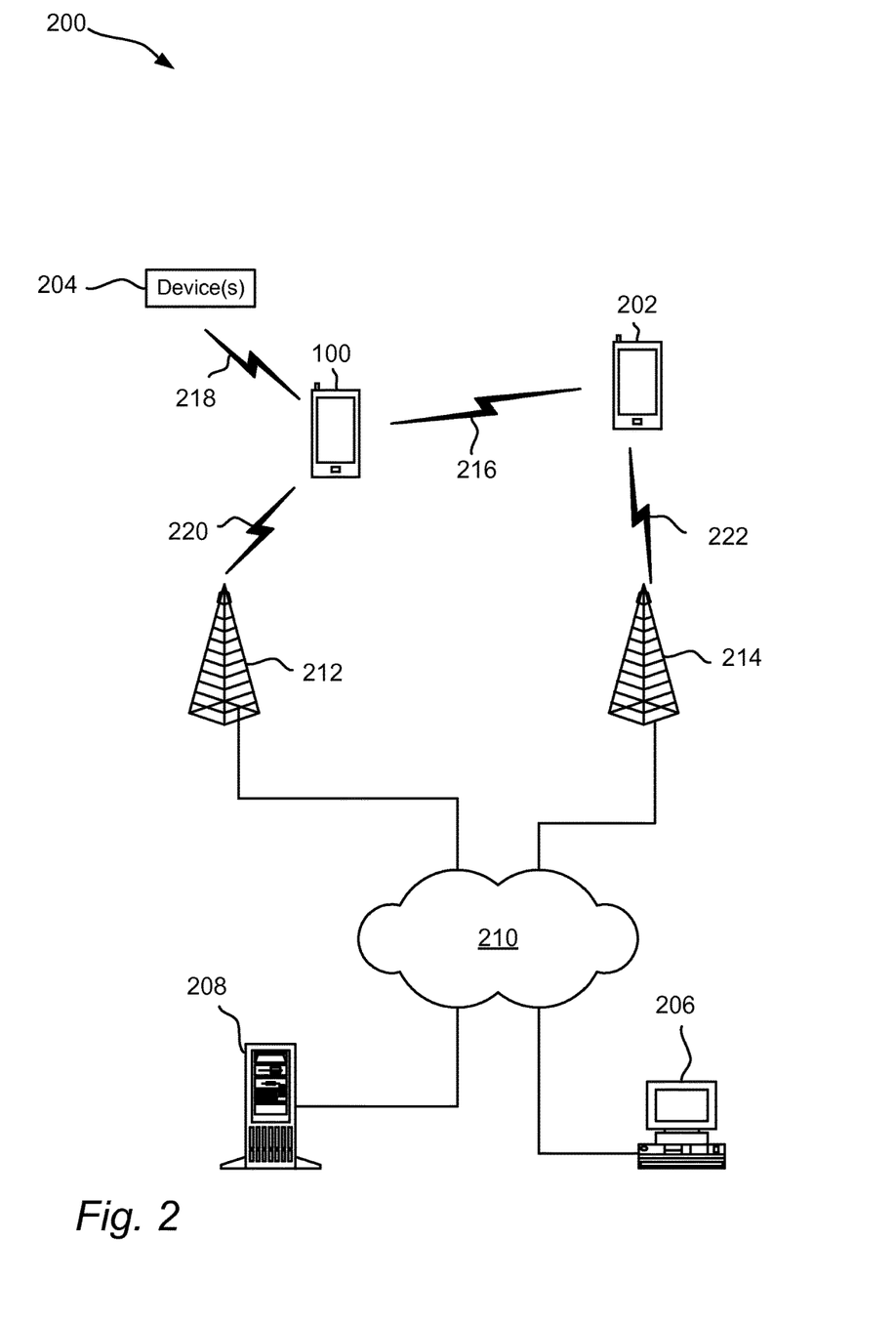
FIG. 2 is a schematic illustration of a communications system according to embodiments.

FIG. 2 illustrates an example of a communications system 200 in which embodiments of the disclosed subject matter may be applied. In the communications system 200 of FIG. 2, various data services such as cellular voice calls, www/wap browsing, cellular video calls, data calls, facsimile transmissions, music transmissions, still image transmissions, video transmissions, electronic message transmissions, electronic positioning information, and electronic commerce may be performed between the communications device 100 and other devices, such as one or more further communications devices 202, a local device 204, a computer 208, or a server 206. For different embodiments of the communications device 100 and in different situations relating to the operating conditions of the communications system 200, different ones of the data services referred to above may or may not be available; the disclosed subject matter is not limited to any particular set of services in this respect.

The communications devices 100, 202 are arranged to be operatively connected to a network 210 through radio frequency links 220, 222 via base stations 212, 214. The base stations 212, 214 are operatively connected to the network 210. The network 210 may be in compliance with any commercially available network standard, such as GSM, UMTS, D-AMPS, CDMA2000, FOMA, TD-SCDMA, IPv4, IPv6 and the like.

The network 130 may be an integrated part of the Internet. A server 208, which may be an Internet server, has a data storage and is operatively connected to the network 210, as is a computer 206. The server 208 may host a www/wap server capable of serving www/wap content to the communications devices 100, 202. The server 208 may also be a server for a general data service.

The communications device 100 may also be capable of communicating locally via a local link 218 to one or more local devices 204. The local link can be any type of link with a limited range, such as Bluetooth, a Universal Serial Bus (USB) link, a Wireless Universal Serial Bus (WUSB) link, an IEEE 802.11 wireless local area network link, an RS-232 serial link, and communications aided by the infrared data association (IrDA) standard, etc. The communications device 100 may also be capable of communicating locally via a local link 216 to the one or more further communications devices 202.

Figure 4A:
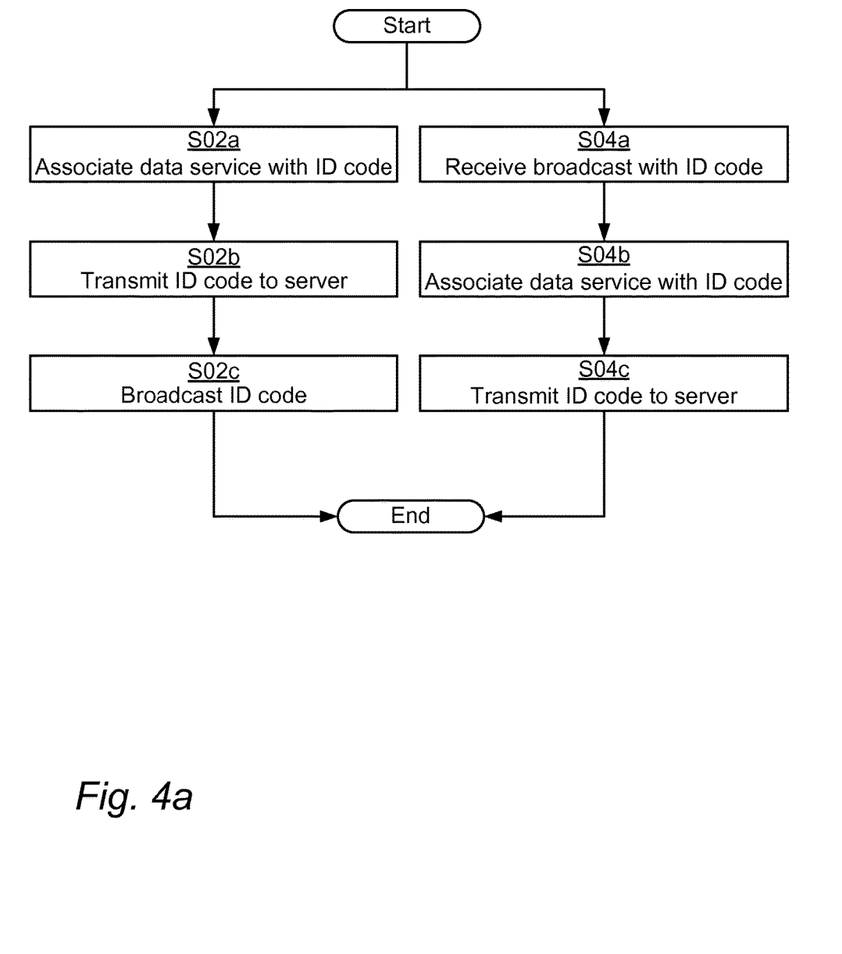
FIGS. 4*a-b* are flowcharts according to embodiments.
Figure 4B:
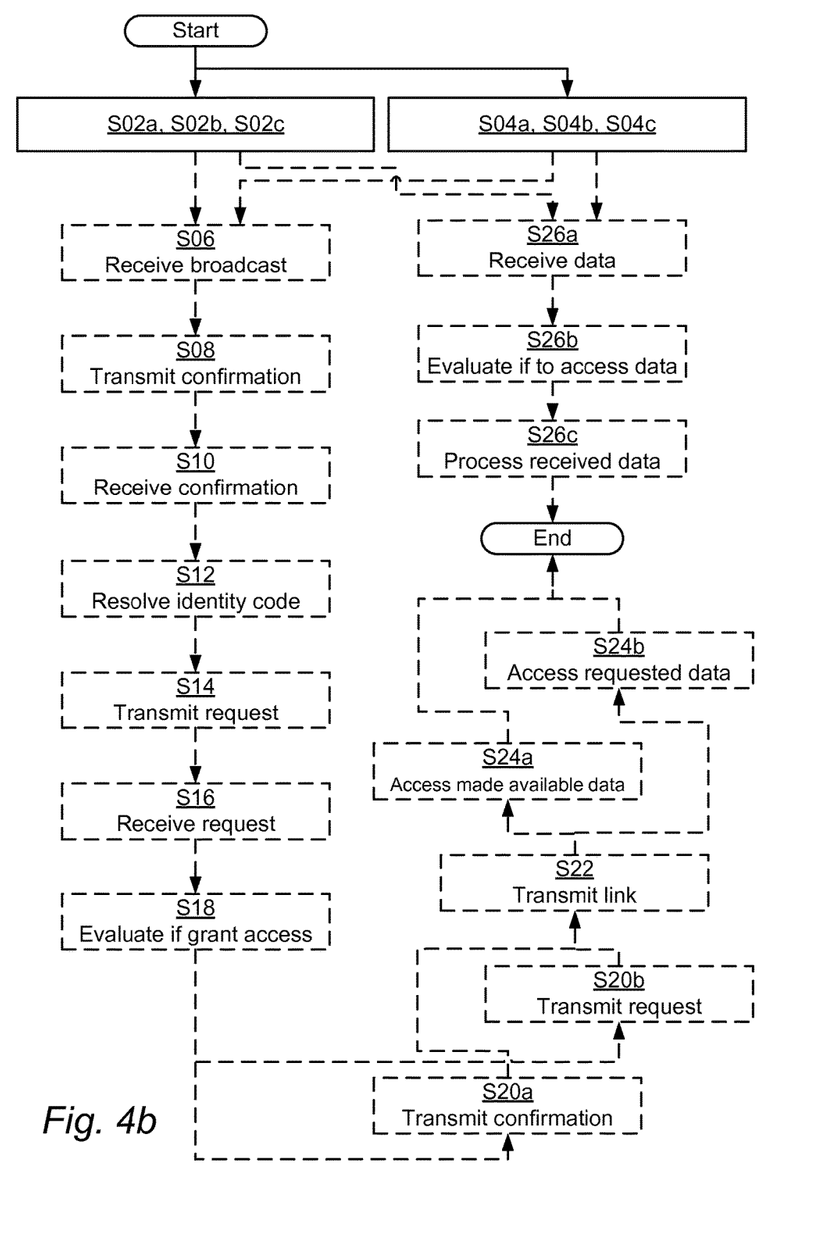

Methods for enabling an indirect communications channel between communications device will be described with references to FIGS. 1 and 2 as well as the flowcharts of FIG. 4a and FIG. 4b.

Each of the communications devices 100, 202 disclosed herein may act as both a transmitting device and a receiving device, where the transmitting device initiates communications by broadcasting an identity code, and where the receiving device receives the identity code being broadcast by the transmitting device. The embodiments will be disclosed with references to such a transmitting device and to such a receiving device.

The disclosed embodiments is based on broadcasting of an identity code from a transmitting device. The identity code is arranged to identify the device from which it is broadcast. In order for the transmitting device to broadcast such an identity code the identity code must be generated. An identity code may be generated in many ways. The disclosed embodiments are not limited to particular types of identity codes or how such identity codes are generated. For example, the identity code itself may be associated with at least one from the group of audio data, tactile data, radio frequency data, picture data, video data.

According to an embodiment the server 208 may generate the identity code. The identity code may uniquely identify the communications device 100 acting as a transmitting device. In this context the term uniquely may be interpreted as at least one of uniquely in time or uniquely in space (i.e.

location). The identity code may be unique during a predetermined period of time. The identity code may uniquely identify the communications device 100 as well as a data service associated with the communications device 100. In other words, the identity code may be embedded with data.

The thus generated identity code may be transmitted to the transmitting device via the network 210. The transmitting device may receive the identity code a through communications interface 108 and store the identity code in the memory 106. Alternatively, the server 208 may generate one or more parameters to an identity code and then transmit the parameters to the transmitting device. The transmitting device may then generate the identity code based on the received parameters. Alternatively the parameter(s) may be generated by the transmitting device. The transmitting device may then transmit the parameter(s) to the server 208, whereby the server may generated the identity code based on the received parameter(s). Yet alternatively the identity code (or the one or more parameters for generating such an identity code) may be generated by the computer 206 or by the device 204 and then transmitted to the transmitting device.

The generation of the identity code (or parameters relating to the identity code) may be initialised by the transmitting device which may request the server 208, the device 204 or the computer 206 to transmit an identity code (or parameters relating to the identity code) to the transmitting device. Alternatively the server 208, the device 204 or the computer 206 may transmit an identity code (or parameters relating to the identity code) to the transmitting device as the transmitting device enters a broadcast mode.

Yet alternatively the identity code may be generated by the transmitting device itself (i.e. independently of other parameters or data received from or generated by other devices). The identity code may be generated by the identity code generator 116 and then stored in the memory 106. In case the identity code is generated by the transmitting device, the transmitting device may transmit the identity code (or parameters thereof) to the server 208 through the communications interface 108 so that the server 208 may resolve the identity of the transmitting device from the received identity code. When having access to an identity code the communications device 100 (acting as the transmitting device) may enter a broadcast mode.

In a step S02a the communications device 100 acting as the transmitting device associates, in the processing unit of the communications device 100, a data service selected from a set of data services with an identity code. The identity code identifies the communications device. Particularly, the communications device 100 may receive a selection of the identity code. The selection of identity code may be received from a user of the communications device 100 through a user interface, or from another device through a communications interface. The communications device 100 may then receive selection of a data service from a set of data services. The selection of data service may be received from a user of the communications device 100 through a user interface, or from another device through a communications interface. The processing unit may then associate the data service and the identity code.

In a step S02b data related to the identity code is transmitted through a first communications interface of the communications device 100 to the server 208. In general, it may be required that the communications device 100 is (indirectly) connected to the server 208. The step of connecting the communications device 100 to the server 208 may occur when the communications device 100 enters the broadcast mode. During the step of connecting the communications device 100 may provide the server 208 with its identity (and/or an identity code). Thus the transmitted data related to the identity code may include a link to a newly generated identity code, a previously generated identity code or the identity code itself. As an example the identity code may be transmitted through a radio frequency communications interface over a cellular network to the server 208. Thereby the server 208 may receive information pertaining to the broadcast to be made by the communications device 100 in addition to the identity of the communications device 100.

In a step S02c the identity code is broadcast by the communications device 100 acting as the transmitting device. The identity code is broadcast through a second communications interface of the communications device 100. The second communications interface is according to a preferred embodiment different from the first communications interface of the communications device 100. In other words, in this respect the communications device 100 initiates the communications by broadcasting an identity code and hence takes the role of the transmitting device.

The communications device 100 may instead of entering the broadcast mode enter a receiving mode and hence take the role of the receiving device (steps S04a-c).

In a step S04a the communications device 100 receives a broadcast through the second communications interface of the communications device 100 (thus acting as the receiving device). The broadcast may be transmitted by at least one further communications device having entered a broadcast mode (thus acting as the transmitting device). The broadcast is transmitted during a predetermined period of time and comprises an identity code which identifies the at least one further communications device. Thus, in other words, in this respect the communications device 100 does not initiate the communications, but instead receives a broadcast identity code and hence takes the role of the receiving device.

In a step S04b the communications device 100 acting as the receiving device associates, in the processing unit of the communications device 100, a data service selected from a set of data services with the received identity code.

In a step S04c data related to the identity code is transmitted through the first communications interface of the communications device 100 to the server 208.

The data service may relate to a data service made available by the transmitting device. Alternatively, the data service may relate to a data service requested by the transmitting device. The transmitting device may, for example by receiving instructions via user input already have information relating to which data service that is desired. For example, the transmitting device may receive user instructions that a particular picture is to be transmitted to and displayed on a display of a further device or that at least one further communications device should be granted access to download the particular picture from a web server. The user instructions, which may be associated with the identity code, may be received before or after an indirect communications link has been established between the communications device 100 and the at least one further communications device. Particularly the data service may be associated with the identity code if the identity code is to be broadcast by the communications device 100.

In general, the data service may be associated with a user application of the communications device 100. For example, the data may be related to multimedia content, such as images, audio clips, movie clips, or the like. The multimedia content may be related to Internet services, such as personal web albums or the like. The data service may also be related to data files, instructions for the processing unit, device settings, or a password for accessing a service and/or a device. As a first example the data service may relate to an image in a personal web album made available by the communications device 100. The data may also be associated with contact information, such as information stored in a phonebook database of the communications device 100. As a second example the data service may relate to a request pertaining to additional information relating to an information post in the phonebook database of the communications device 100. The data service may also relate to initiation of payment transactions between the communications device 100 and a further device. In conclusion, the disclosed subject matter may therefore enable easy photo sharing from device to device; from phone to phone, from phone to TV, contact sharing, initiation of payment transactions, and so on. Any data associated with the data service may be hosted by the server. Alternatively such data may be hosted by the communications device 100. Yet alternatively the data such data may be hosted by the at least one further communications device.

As noted above the identity code may be associated with at least one from the group of audio data, tactile data, radio frequency data, picture data. According to preferred embodiments the second communications may therefore be one from the group of an audible, a tactile, a WiFi and a picture based communications interface. The identity code is preferably transmitted (or received) through a non-radio frequency communications interface of the communications device 100. The non-radio frequency communications interface may be a user interface of the communications device 100, where user interface output itself defines code.

In case the identity code is associated with audio data the identity code may be broadcast as a sound through an audio communications interface of the communications device 100 (or the at least one further communications device). The identity code may for example be embodied as a melody, wherein parameters of the identity code defines the tones of the melody. Particularly, the identity code may be associated with a ring tone of the communications device 100 (or the at least one further communications device). Broadcasting the identity code may then be performed by outputting the melody through an audio communications interface, such as a speaker of the communications device 100 (or the at least one further communications device). In general, if audible to a human being (e.g. having a frequency content in the interval 20 to 20 000 Hz) it may be required that the identity code is generated based on basic principles of music such that the outputted melody is pleasant to the human ear. This requirement may not be imposed if the frequency content is below 20 Hz (corresponding to a low frequency identity code) or above 20 000 Hz (corresponding to a high frequency identity code). The broadcast by means of audio communications may allow a communications device to receive the broadcast identity code by means of audio detecting circuitry, such as a microphone.

In case the identity code is associated with tactile data the identity code may be broadcast as a tactile signal through a tactile communications interface of the communications device 100 (or the at least one further communications device). The tactile signal may be associated with a vibration pattern. For example, the identity code may be outputted as a coded vibration signal. The identity code may determine properties of the vibration pattern. This may allow a communications device to receive the broadcast identity code by means of vibration detecting circuitry.

In case the identity code is associated with picture data the identity code may be broadcast as a picture through a picture communications interface of the communications device 100 (or the at least one further communications device). The picture data may be associated with a picture having been captured, received, or generated by the communications device 100 (or the at least one further communications device). The communications device 100 (or the at least one further communications device) may thus be arranged to receive picture data and to generate the identity code based on the received picture data. For example, the identity code may be based on the background picture displayed on a vision-based user interface of the communications device 100 (or the at least one further communications device). A user may thereby define the picture data which is to be associated with the identity code to be broadcast. The picture data may for example correspond to a blurry background picture. This may allow a communications device to receive the broadcast identity code by means of image capturing (i.e. by means of image receiving circuitry, such as a camera). Specifically, the communications device may be arranged to capture an image of the blurry background picture by means of image capturing circuitry pre-set to blurry focus, whereby the image capturing circuitry blurs away details of text and other data displayed in front of the blurry background. The background picture may comprise two or more coloured fields. Properties such as dimension, location and/or colour of the fields may thereby define the identity code. The identity code may also be broadcast as a sequence of flashing colours where the pattern, for example in terms of lengths and colours of the flashes, determines the identity code.

The identity code may also be transmitted through a radio frequency communications interface of the communications device 100 (or the at least one further communications device). For example, the identity code may be broadcast using the Bluetooth standard where the broadcast message may comprise the International Mobile Equipment Identity (IMEI) as the identity code. Alternatively the broadcast message may comprise a separate identity code separated from the IMEI. In similar way the identity code may be broadcast using WiFi. These type of identity codes may already be known by the server. As disclosed below the receiving communications device intended to receive the broadcast from the transmitting communications device does not acknowledge the transmitting communications device the reception of the broadcast message. In contrast to the communications protocol of the normal Bluetooth standard there is according to the disclosed subject matter therefore no direct pairing between the transmitting communications device and the receiving communications device. In other words, the transmitting communications device and the receiving communications device do not utilize mutual two-way communications (which in turn enables a direct communications channel between them). The communications channel between the transmitting communications device and the receiving communications device may therefore be said to be indirect.

In general, the identity code to be broadcast may have embedded error correction properties. Error protection may be embedded by means of repetition patterns or by code, such as convolutional codes. The broadcast of the identity code may be encrypted (by using RSA, public key encryption, Diffie-Hellman key exchange, algorithms based on elliptic curves or the like) and it may comprise a digital signature of the transmitting communications device.

The broadcasted message/id or parts thereof may comprise a public key according to RSA, Diffie-Hellman key exchange, or other PKE standards to further reduce the latency if the communication between the transmitting communications device and the receiving communications device is to be encrypted and/or signed. In such way, the receiving communications device may immediately encrypt or sign its traffic to the transmitting communications device. The server and the transmitting communications device and the receiving communications device may synchronize their keys such that that the server knows exclusively the public keys of the transmitting communications device and the receiving communications device. The server may thereby not be able to interpret the data content (i.e. data relating to the payload) of the communication. Alternatively the server may have access to also the private keys of the transmitting communications device and the receiving communications device for a particular session, and thus can receive as well as interpret the communication. The transmitting communications device and the receiving communications device may alternatively utilize the servers' public key to enable communication with the server.

In addition, the devices involved in the initiation process may utilize various authentication means to establish whether or not the requested data service is available for both parties. Such validation can be automatic based in predefined rules, or manual. Preferably the authentication, encryption, error correction, and/or signing means is embedded in the identity codes, thereby enabling communication with low latency, removing the roundtrips of communication between the server and the devices.

The identity code may be broadcast during a predetermined period of time. This predetermined period of time may be 5 seconds to 5 minutes, preferably between 5 seconds and 2 minutes, even more preferably between 5 seconds and 1 minute. If the transmitting communications device does not receive a confirmation message from the server that a receiving communications device has received the broadcast message (inter alia within a predetermined time interval) the transmitting communications device may be arranged to broadcast the identity code again until such a confirmation message is received or until a predetermined period of time has elapsed. This predetermined period of time may be 1 to 5 minutes. Alternatively the predetermined period of time may continue as long as the transmitting communications device is in the broadcast mode. Likewise, the identity code may be broadcast within a predetermined radius of the transmitting communications device. In general, the transmission strength of the broadcast signal may determine the radius within which the broadcast signal may be received. The signal strength may be affected by user input. Muting the signal strength will generally result in the radius being decreased. Thereby a user of the transmitting communications device may determine the radius of the broadcast (and thus, potentially, which devices that may receive the broadcast). It may thus be required that the transmitting communications device and the receiving communications device are within close vicinity of each other, where the distance "close vicinity" is defined by the broadcast radius of the transmitting communications device. The transmitting communications device broadcasting the identity code could be remotely connected to a remote server. This remote server may act as a remote controller and thereby control the transmitting communications device broadcasting the identity code. For example, the remote server may control when to broadcast the identity code, which identity code to broadcast, and which data service to associate with the identity code.

The broadcast of the identity code is in general intended to be received by at least one further communications device (denoted here as the receiving communications device). Preferably the transmitting communications device intends the receiving communications device to access the data service made available by the transmitting communications device. Alternatively the transmitting communications device assumes that the receiving communications device will allow the transmitting communications device to access the data service requested by the transmitting communications device. However, by nature of any broadcast-type transmission the transmitting communications device does not necessary "know" that the receiving communications device even exists. In order for the receiving communications device to receive the broadcast from the transmitting communications device it may be required that the receiving communications device has entered a receiving mode.

In a step S06 the receiving communications device receives the broadcast from the transmitting communications device without acknowledging the transmitting communications device the reception thereof. Thus, during initialisation there is no direct two-way communications link established between the transmitting communications device and the receiving communications device.

Instead of transmitting an acknowledging message to the transmitting communications device the receiving communications device transmits to the server, in a step S08, a confirmation message relating to the reception of the broadcast message by the receiving communications device. The confirmation message preferably comprises information relating to the detected identity code of the transmitting communications device as well as the identity of the receiving communications device. Position data of the receiving communications device may be excluded from the transmitted confirmation message, thus saving data that needs to be transmitted.

Alternatively the transmitted confirmation message may included position data of the at receiving communications device, at the cost of extra data. By transmitting a confirmation message to the server the receiving communications device indicates that it either requests access to the data service made available by the transmitting communications device or that the receiving communications device is willing to make available the data service requested by the transmitting communications device 100.

The confirmation message transmitted by the receiving communications device is received by the server, step S10. The server resolves the identity code broadcast by the transmitting communications device and the identity of the receiving communications device from the received confirmation message, step S12. The server can thereby compare the identity code as received and forwarded by the receiving communications device with the identity code received from the transmitting communications device. The server may in addition identify the data service relating to the identity code.

In case of a positive evaluation of the comparison the server may in a step S14 transmit a message to the transmitting communications device requesting the transmitting communications device to confirm that the receiving communications device shall be granted access to the data service associated with the identity code or to confirm that the transmitting communications device may access the data service made available by the receiving communications device. However, the server may have access to a predefined policy associated with the data service. In such a case the server may not need to transmit a confirmation message to the transmitting communications device.

The confirmation message (if such a message is transmitted) may then in a step S16 be received by the transmitting communications device. Particularly the confirmation message may comprise a request pertaining to whether or not the receiving communications device shall be granted access to the data service or it may comprise an acknowledgement confirming that the receiving communications device has allowed the transmitting communications device to access the data service.

After receipt of the confirmation message the transmitting communications device may in its processing unit evaluate whether or not the identified receiving communications device shall be granted access to the data service, step S18. In response to a positive evaluation, the transmitting communications device may transmit a confirmation message, in a step S20a, to the server allowing the receiving communications device to access the data service. Alternatively, if the confirmation message concerns a data service requested by the transmitting communications device, the transmitting communications device may access the data service by transmitting a data service request message, step in a S20b, relating to the data service to the server. From point of view of the transmitting communications device the initialisation phase for enabling an indirect communications channel between the transmitting communications device and the receiving communications device may thereby be regarded as completed.

The server may, upon reception of the confirmation message from the transmitting communications device, to the receiving communications device, transmit a link to the data service made available, thereby enabling the receiving communications device to access the data service, step S22. After safe receipt of the link by the receiving communications device the receiving communications device may access the made available data service, step S24a. Alternatively, if the data service is made available to the transmitting communications device the link may be transmitted to the transmitting communications device so that the transmitting communications device may access the requested data service, step S24b. Yet alternatively, in order to avoid latency the payload (i.e. data related to the data service) may be transmitted directly to the transmitting communications device from the receiving communications device. The payload may be coupled to means for authentication, such as a public key to be used in a public key encryption system. Particularly, in a step S26a the transmitting communications device may receive, from the receiving communications device, data and thereto coupled authentication information. The data may be received directly from the receiving communications device or indirectly via the server. Based on the authentication information the transmitting communications device may then in its processing unit evaluate whether or not the transmitting communications device shall access the data service, step S26b. In response to a positive evaluation thereof, the transmitting communications device may process the received data, step S26c.

Two exemplary scenarios where the disclosed embodiments may readily apply will now be described with reference to FIGS. 3a-d. In relation to FIGS. 3a-d and the description thereof the communications device referred to as the transmitting communications device broadcasts an identity code, and the communications device referred to as the receiving communications device receives the identity code being broadcast. Both communications devices 100 and 202 can take the role of the transmitting communications device and the receiving communications device, respectively.

Figure 3A:
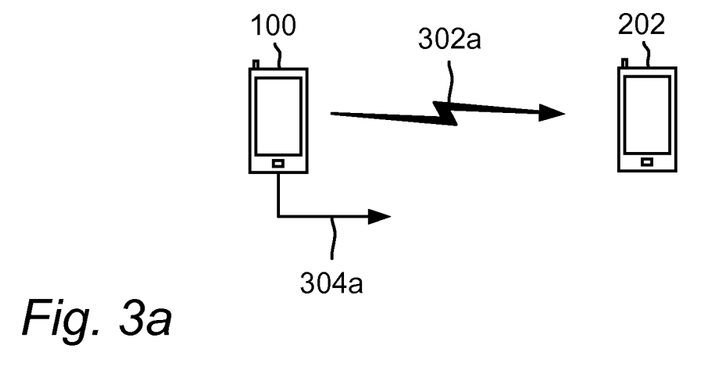
FIGS. 3*a-b* are examples of communications devices initiating communications according to embodiments.

According to the exemplary scenario illustrated in FIG. 3a the transmitting communications device 100 broadcasts 302a an identity code. The transmitting communications device 100 also initiates 304a a data service. The broadcast is received by the receiving communications device 202. As an example the data service may be associated with data, such as images in a web album, made available by a user of a mobile phone (i.e. the transmitting communications device 100). For example the transmitting communications device 100 may issue a broadcast in response to the web album having been updated with a new image. As a result of successful reception of the broadcast a user of another mobile phone (i.e. the receiving communications device 202) may, by performing steps according to one or more of the above disclosed embodiments, access (via the server 208) the new image. Thus the disclosed embodiments may be applied in social interactive computer-based networks.

Figure 3B:
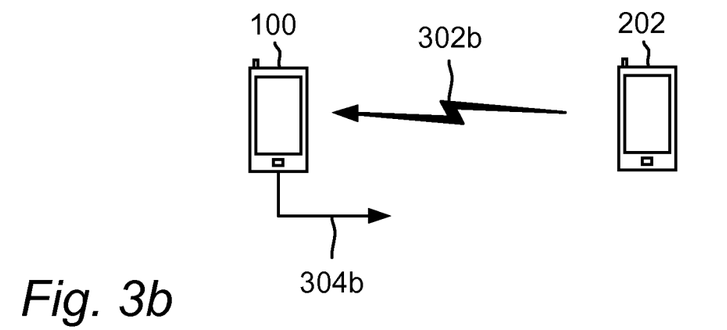

According to the exemplary scenario illustrated in FIG. 3b the transmitting communications device 202 broadcasts 302b an identity code. The broadcast is received by the receiving communications device 100. The receiving communications device 100 initiates 304b a data service. As an example the data service may be associated with the display of data, such as the display of images on a screen by a display device, such as a digital projector, where the digital projector (i.e. the transmitting communications device 100) broadcasts an identity code and by virtue thereof announces that it is ready to receive images or data to be displayed. The receiving communications device 202, which may be a computer or a mobile phone or another multimedia device capable of receiving the broadcast may as a result of successful reception of the broadcast), and by performing steps according to one or more of the above disclosed embodiments, upload (via the server 208) images or data to be displayed to the digital projector (i.e. the transmitting communications device 100) so that the images or data may be displayed by the digital projector.

In summary, the disclosed embodiments relate to means for initiating communications between two devices. The first device transmits a broadcast signal. The broadcast signal includes an identity code which identifies the first device. There are different ways to transmit the broadcast, for example audio, images, or the like, could be used. The broadcast is received by the second device. The second device then transmits a message to a server. The message includes the identity code received in the broadcast message. By comparing identity codes it may then be determined if communications should be initiated between the two devices.

The invention has mainly been described above with reference to a certain examples. However, as is readily appreciated by a person skilled in the art, other examples than the ones disclosed above are equally possible within the scope of the invention, as defined by the appended patent claims.

The invention claimed is:

1. A method for establishing an indirect communication channel between a first communications device and at least one further communications device, comprising:
  associating, in a processing unit of the first communications device, a data service selected from a set of data services with an identity code, the identity code identifying the first communications device and the identity code being temporarily unique during a predetermined period of time;

transmitting, by the first communications device through a first communications interface thereof, data related to the identity code to a server; and broadcasting, by the first communications device through a second communications interface thereof, which is a different communications interface than the first communications interface, said identity code, the broadcast being intended to be received by multiple further communications devices to enable at least one further communications device to access a data service made available by the first communications device;

wherein the period of time for the temporary identity code is linked with the broadcasting of the first communications device.

2. The method of claim 1, further comprising:
receiving, from the at least one further communications device, data and thereto coupled authentication information;
evaluating, in the processing unit and based on the authentication information, whether or not the at least one further communications device shall access said data service; and
in response to a positive evaluation thereof, processing the received data.

3. The method of claim 1, wherein the data service relates to a data service made available by the first communications device.

4. The method of claim 1, further comprising:
receiving, from the server and through the first communications interface, a request pertaining to whether or not the at least one further communications device shall be granted access to said data service;
evaluating, in the processing unit, whether or not the at least one further communications device shall be granted access to said data service; and
in response to a positive evaluation thereof, transmitting, through the first communications interface, a message to said server allowing the at least one further communications device to access said data service.

5. The method of claim 1, further comprising:
receiving, from the server and through the first communications interface, an acknowledgement confirming that the at least one further communications device has allowed the communications device to access said data service; and
accessing said data service by transmitting, through the first communications interface, a data service request message relating to said data service to the server.

6. The method of claim 1, further comprising:
receiving, from the server and through the first communications interface, parameters relating to the identity code; and
generating, in the processing unit, the identity code based on said received parameters.

7. The method of claim 1, further comprising:
extracting code parameters based on at least one from a group of user input, time, position, and picture data; and
generating the identity code based on said code parameters.

8. The method of claim 1, wherein the identity code itself identifies the data service associated therewith.

9. The method of claim 1, wherein the second communications interface is a non-radio frequency transmitter interface.

10. The method of claim 1, wherein the second communications interface is a user interface of the first communications device.

11. The method of claim 10, wherein the user interface is arranged to display visual data and wherein the visual data defines the identity code.

12. A method for establishing an indirect communication channel between a first communications device and at least one further communications device, comprising:
receiving, by a first communications device from a second communications device through a second communications interface a broadcast comprising an identity code during a predetermined period of time, the identity code identifying the second communications device and the identity code being temporarily unique during a predetermined period of time, the broadcast being made available to multiple communication devices to enable at least one of the multiple communications devices to access a data service made available by the second communications device, wherein the period of time for the temporary identity code is linked with the broadcasting of the second communications device;
associating, in a processing unit of the first communications device, a data service selected from a set of data services with the identity code; and
transmitting, by the first communications device, through a first communications interface thereof, which is a different communications interface than the second communications interface, data related to the identity code to a server.

13. A communications device configured to establish an indirect communication channel between the communications device and at least one further communications device, comprising:
a processing unit of the communications device configured to associate a data service selected from a set of data services with an identity code, the identity code identifying the communications device and the identity code being temporarily unique during a predetermined period of time;
a transmitter configured to transmit, by the communications device through a first communications interface thereof, data related to the identity code to a server; and
a broadcasting unit configured to broadcast, by the communications device through a second communications interface thereof, which is a different communications interface than the first communications interface, said identity code, the broadcast intended to be received by multiple further communications devices to enable at least one further communications device to access a data service made available by the communications device;
wherein the period of time for the temporary identity code is linked with the broadcasting of the communications device.

14. The communications device of claim 13, further comprising:
a receiver configured to receive, from the at least one further communications device, data and thereto coupled authentication information, wherein the processing unit is further configured to evaluate, based on the authentication information, whether or not the at least one further communications device shall access said data service, and in response to a positive evaluation thereof, processing the received data.

15. The communications device of claim 13, wherein the data service relates to a data service made available by the first communications device.

16. The communications device of claim 13, further comprising:
- a receiver configured to receive, from the server and through the first communications interface, a request pertaining to whether or not the at least one further communications device shall be granted access to said data service;
- an evaluation unit configured to evaluate, whether or not the at least one further communications device shall be granted access to said data service, wherein, in response to a positive evaluation thereof, the transmitter is configured to transmit, through the first communications interface, a message to said server allowing the at least one further communications device to access said data service.

17. The communications device of claim 13, further comprising:
- a receiver configured to receive, from the server and through the first communications interface, an acknowledgement confirming that the at least one further communications device has allowed the communications device to access said data service; wherein, the transmitter is further configured to access said data service by transmitting, through the first communications interface, a data service request message relating to said data service to the server.

18. The communications device of claim 13, further comprising:
- a receiver configured to receive, from the server and through the first communications interface, parameters relating to the identity code, wherein the processing unit is further configured to generate an identity code based on said received parameters.

19. The communications device of claim 13, further comprising:
- an extraction unit configured to extract code parameters based on at least one from a group of user input, time, position, and picture data; and
- a generation unit configured to generate the identity code based on said code parameters.

20. The communications device of claim 13, wherein the identity code itself identifies the data service associated therewith.

* * * * *